United States Patent
Wen et al.

(10) Patent No.: US 11,230,792 B2
(45) Date of Patent: Jan. 25, 2022

(54) VERTICAL ELECTROPLATING MODULE AND ELECTROPLATING METHOD FOR FAN-OUT PANEL LEVEL CHIP

(71) Applicant: Manz China Suzhou Ltd., Jiangsu (CN)

(72) Inventors: Wei-Chuan Wen, Jiangsu (CN); Hong-Xing Yuan, Jiangsu (CN)

(73) Assignee: MANZ CHINA SUZHOU LTD., Jiangsu (CN)

( * ) Notice: Subject to any disclaimer, the term of this patent is extended or adjusted under 35 U.S.C. 154(b) by 1 day.

(21) Appl. No.: 17/084,292

(22) Filed: Oct. 29, 2020

(65) Prior Publication Data
US 2021/0140062 A1    May 13, 2021

(30) Foreign Application Priority Data
Nov. 12, 2019  (CN) .......................... 201911093029.8

(51) Int. Cl.
C25D 17/02    (2006.01)
C25D 3/38    (2006.01)
C25D 17/00    (2006.01)

(52) U.S. Cl.
CPC .............. *C25D 17/02* (2013.01); *C25D 3/38* (2013.01); *C25D 17/001* (2013.01)

(58) Field of Classification Search
CPC ............ C25D 7/12–123; C25D 17/001; H01L 21/2885; H01L 21/76873
See application file for complete search history.

(56) References Cited

U.S. PATENT DOCUMENTS

2002/0027080 A1* 3/2002 Yoshioka ............... C25D 17/02
                                                        205/123
2021/0140062 A1    5/2021 Wen et al.

FOREIGN PATENT DOCUMENTS

CN        103298980 A      9/2013
TW        M608481 U        3/2021

OTHER PUBLICATIONS

Office Action and Search Report issued in Corresponding TW application No. 109135062 dated Jul. 14, 2021 (3 pages).

* cited by examiner

*Primary Examiner* — Ho-Sung Chung
(74) *Attorney, Agent, or Firm* — Muncy, Geissler, Olds & Lowe, P.C.

(57) ABSTRACT

The present disclosure illustrates a vertical electroplating module and an electroplating method for a fan-out panel level chip. The vertical electroplating module has an electroplating tank module, an exhaust tank module and a clamping module. A first box of the electroplating tank module has a first receiving chamber, a second receiving chamber and a third receiving chamber, the first receiving chamber is communicated with a bottom of the second receiving chamber, and a top of the second receiving chamber is communicated with the third receiving chamber. The exhaust tank module is communicated with the first receiving chamber and the third receiving chamber respectively via a first pump and a second pump. The clamping module is disposed around the opening on a wall of the second receiving chamber. The production made by the vertical electroplating module can meet a single-side production, without immersing the entire product in the chemical medicine.

11 Claims, 13 Drawing Sheets

VERTICAL ELECTROPLATING MODULE AND ELECTROPLATING METHOD FOR FAN-OUT PANEL LEVEL CHIP

TECHNICAL FIELD

The present disclosure relates to an electroplating field, in particular to, a vertical electroplating module and an electroplating method for a fan-out panel level chip.

RELATED ART

A conventional vertical electroplating may be generally a gantry electroplating or a vertical continuous electroplating (VCP). The gantry electroplating is to clamp the product to the special fixture, and use the crane to soak the fixtures with the product into the tank one by one. During electroplating, the current is output to the fixture, and then conducted to the product board surface via the metal clamping point of the fixture, such that the copper ions in the chemical medicine are adhered to the production board to form the required copper.

The Vertical continuous electroplating (VCP) is to clamp the product by using a specific jaw, use a drag chain to transport, and continuously soak the product into different tanks, clamp the product by using a specific fixture, and use a crane to immerse the fixtures having the products into the tank one by one. During electroplating, the current is output to the fixture, and then conducted to the product board surface via the metal clamping point of the fixture, such that the copper ions in the chemical medicine are adhered to the production board to form the required copper.

Whether it is gantry electroplating or vertical continuous electroplating, the whole product needs to be immersed in the chemical medicine, which cannot meet the single-sided production, and the corresponding clamps are required to meet the needs of electrical conductivity. Since the fixture will also be immersed in the chemical medicine, it will also be plated with copper, which not only wastes the chemical medicine, but also increases the trouble of maintenance. Due to the current vertical electroplating capacity limitation, once the capacity demand increases, the entire production line can only be repurchased.

SUMMARY OF THE PRESENT DISCLOSURE

To overcome the deficiency of the prior art, the present disclosure provides a vertical electroplating module and an electroplating method for a fan-out panel level chip. The production can meet a single-side production, without immersing the entire product in the chemical medicine.

To achieve the above objective, the present disclosure provides a vertical electroplating module for a fan-out panel level chip, at least comprising: an electroplating tank module comprising a first box, wherein the first box has a first receiving chamber, a second receiving chamber and a third receiving chamber therein, the first receiving chamber has an electroplating anode mesh therein, the first receiving chamber and the second receiving chamber are communicated with each other, the second receiving chamber and the third receiving chamber are communicated with each other, a wall of the second receiving chamber has an opening thereon, the opening has fins thereon, electroplating liquid in the first receiving chamber is pumped to a bottom of the second receiving chamber, and the electroplating liquid in the second receiving chamber flows to the third receiving chamber from a top of the second receiving chamber; an exhaust tank module communicated with the first receiving chamber and the third receiving chamber respectively via a first pump and a second pump, wherein the first pump pumps the electroplating liquid in the first receiving chamber to the second receiving chamber, the electroplating liquid flows to the third receiving chamber from the top of the second receiving chamber, the third receiving chamber is communicated with the exhaust tank module via the second pump of the filter module, the second pump pumps the electroplating liquid in the third receiving chamber to the exhaust tank module; a clamping module disposed around the opening, used to cover a product on the opening.

In one embodiment of the present disclosure, the fin is in transmission connection with a motor, and the fin swings under an action of the motor.

In one embodiment of the present disclosure, the first box has a first sensor therein, and the first sensor is used to sense a level of electroplating liquid in the first receiving chamber and the third receiving chamber.

In one embodiment of the present disclosure, the top of the second receiving chamber has a second sensor, and the second sensor is used to sense a level of electroplating liquid in the second receiving chamber.

In one embodiment of the present disclosure, the third receiving chamber has a third sensor therein, and the third sensor is used to sense a level of electroplating liquid in the third receiving chamber.

In one embodiment of the present disclosure, the exhaust tank module includes a second box, the second box has a fourth receiving chamber, a bottom of the second box has a fifth baffle, one side of the fifth baffle has a second baffle, and the second baffle is set on a top of the second box.

In one embodiment of the present disclosure, the vertical electroplating module for the fan-out panel level chip further comprises an external circulation tank, the external circulation tank is connected to the second pump, the second pump pumps electroplating liquid in the third receiving chamber to the external circulation tank, and the external circulation tank is communicated with the fourth receiving chamber via a third pump; the external circulation tank has a third baffle therein, the third baffle is set at a bottom of the external circulation tank, and the electroplating liquid entering the external circulation tank firstly enters one side of the third baffle, and then enters other one side of the third baffle from a top of the third baffle.

In one embodiment of the present disclosure, a pipeline communicated with the third receiving chamber and the external circulation tank has a return air-operated valve thereon.

In one embodiment of the present disclosure, a side of the clamping module attached to the opening has a sealing ring thereon The present disclosure further provides an electroplating method which uses the above vertical electroplating module for the fan-out panel level chip, comprising steps of: moving a product to be electroplated to the opening of the electroplating tank module; using the clamping module to clamp the product to be electroplated on the opening; activating the first pump to pump electroplating liquid in the exhaust tank module to the first receiving chamber, wherein the electroplating liquid is transmitted into the second receiving chamber via holes on the top of the first receiving chamber, and when the electroplating liquid in the second receiving chamber does not reach a top of the product, and the second sensor senses that the electroplating liquid in the second receiving chamber reaches a liquid level which the electroplating liquid is able to perform electroplating, the electroplating tank module starts to electroplate the product, and the motor drives the fins to swing; when the electroplating liquid in the second receiving chamber reaches a specific level, the electroplating liquid in the second receiving chamber starts to enter the third receiving chamber, and the third sensor senses that the electroplating liquid enters the third receiving chamber, activating the second pump to pump the electroplating liquid in the third receiving chamber to the fourth receiving chamber; when a electroplating elapses, stopping electroplating, stopping swinging of the fins, and turning off the first pump and third pump, wherein the second pump continues to pump the electroplating liquid in the electroplating tank module into the fourth receiving chamber, and at the same time, turning on a return air-operated valve, so as to make the electroplating liquid in the first receiving chamber flow back into the fourth receiving chamber; when the first sensor senses that the electroplating liquid in the first receiving chamber and the third receiving chamber has exhausted, activating the clamping module to take out the electroplated product.

The beneficial effects of the present disclosure are illustrated as follows.

1. The vertical electroplating module can meet a single-side production, without immersing the entire product in the chemical medicine.

2. It removes the restriction of the fixture, and no special fixture is needed to complete the conductive work; the traditional vertical electroplating requires the fixture to be immersed in the chemical medicine, which will cause the fixture to be plated with copper, and thus, it not only increases the difficulty of fixture maintenance, but also causes the waste of the chemical medicine.

3. The vertical electroplating module provided by the present disclosure is composed of an electroplating tank module, an exhaust tank module, a clamping module and other modules, which can be produced in a modular fashion, and can be adjusted according to product changes and capacity requirements, and can effectively solve the problem of the existing vertical electroplating module that the entire production line must be repurchased when the capacity demand increases, and at the same time can solve the problem of the site caused by the excessively large equipment area; and moreover, the modular combination method will not stop the whole line when one vertical electroplating module fails, and other vertical electroplating modules can still produce products normally to avoid the whole line stagnation caused by abnormalities.

4. The electroplating anode mesh is placed in the first receiving chamber, and the product to be electroplated is placed in the second receiving chamber to effectively prevent the bubbles generated by the anode from entering the electroplating area and affecting the electroplating function of the product; the chemical medicine enters the third receiving chamber through the top of the second receiving chamber, the vertical electroplating overturn design can effectively improve the bubbles generated by the impact after the electroplating reflow, and the bubbles can be eliminated from the tank; and the design of the baffle of the suction tank and the external circulation tank is more conducive to the dissipation of bubbles.

5. The vertical electroplating module can operate in a fully automatic feeding mode, and it lifts manpower restrictions and realizes fully automatic production.

6. The fin in the electroplating tank swings from side to side using the principle of fluid mechanics to realize the function of catching bubbles and filling holes in the tank, and to fully stir the chemical medicine in the electroplating tank to improve the uniformity of product electroplating.

7. The clamping module is used to fix the product to be plated, and the restriction of the fixture is removed, which is more convenient for maintenance and improves production efficiency.

8. The exhaust tank module is designed to use baffles for diversion, and fifth baffle is used for diversion, so that the chemical medicine pumped via the third pump can be fully exhausted in the exhaust tank module, reducing the bubble problem in second receiving chamber (i.e. electroplating tank), and the function of the fifth baffle is to guide the flow direction of the electroplating liquid in the tank, forcing the electroplating liquid to flow from the right side of the fifth baffle, increasing the time of the liquid in the tank, so that the bubbles are eliminated from the liquid.

9. The design of the external circulation tank uses the baffle for diversion, and the third baffle is used for diversion, so that the chemical medicine pumped by the second pump is fully exhausted in the external circulation tank, reducing the bubble problem in the fourth receiving chamber; the third baffle functions to guide the flow direction of the liquid in the tank, forcing the electroplating liquid to flow from the right side of the fifth baffle, increasing the time of the electroplating liquid in the tank, so that the bubbles are removed from the liquid.

10. Three pumps are used to transport the chemical medicine between different tanks and to filter and replace the chemical medicine; at the same time, it is equipped with an external circulation tank, the second pump is used to send the chemical medicine containing a lot of bubbles after electroplating to the external circulation tank; and there is also a baffle to eliminate the bubble problem in the electroplating liquid.

In order to make the above and other objectives, features and advantages of the present disclosure more comprehensible, the following will specifically cite preferred embodiments, combined with the accompanying drawings, for detailed descriptions as follows.

DETAILS OF PREFERRED EMBODIMENTS

In order to explain the embodiments of the present disclosure or the technical solutions in the prior art more clearly, the following will briefly introduce the drawings that need to be used in the description of the embodiments or the prior art. Obviously, the drawings in the following description are merely present for some of the embodiments of the present disclosure, and for those of ordinary skill in the art, other drawings may be obtained based on these drawings without creative work.

The following will clearly and completely describe the technical solutions in the embodiments of the present disclosure with reference to the accompanying drawings in the embodiments of the present disclosure. Obviously, the described embodiments are only a part of the embodiments of the present invention, rather than all the embodiments. Based on the embodiments of the present disclosure, all other embodiments obtained by those of ordinary skill in the art without creative work shall fall within the protection scope of the present disclosure.

In the description of the present disclosure, it should be noted that the directions or positional relationships indicated by the terms "upper", "lower", "bottom", "inner" and "outer" are based on the directions shown in the drawings. It is only for the convenience of describing the present disclosure and simplifying the description, rather than indicating or implying that the device or element referred to must have a specific orientation, be constructed and operated in a specific orientation, and therefore the above terms cannot be understood as a limitation of the present disclosure. In addition, the terms "first", "second", etc. are only used for descriptive purposes, and cannot be understood as indicating or implying relative importance or specifying the number of indicated technical features. Thus, the features defined with "first", "second", etc. may explicitly or implicitly include one or more of these features.

Refer to FIG. 1 through FIG. 10, and to achieve the above objectives, the present disclosure provides a vertical electroplating module for a fan-out panel level chip 100, which comprises an electroplating tank module 1, an exhaust tank module 2 and a clamping module 3. The electroplating tank module 1 comprises a first box 11. The first box 11 has a first receiving chamber 12, a second receiving chamber 13 and a third receiving chamber 14 therein. The first receiving chamber 12 has an electroplating anode mesh 121 therein. The first receiving chamber 12 and the second receiving chamber 13 are communicated with each other, and the second receiving chamber 13 and the third receiving chamber 14 are communicated with each other. A wall of the second receiving chamber 13 has an opening 131 thereon, and the opening 131 has fins 15 thereon. Electroplating liquid in the first receiving chamber 12 is pumped to a bottom of the second receiving chamber 13. The electroplating liquid flows to the third receiving chamber 14 from a top of the second receiving chamber 13. The exhaust tank module 2 is communicated with the first receiving chamber 12 via a first pump 17. The first pump 17 pumps the electroplating liquid in the exhaust tank module 2 to the first receiving chamber 12. The electroplating liquid flows to the third receiving chamber 14 from a top of the second receiving chamber 13. The third receiving chamber 14 is communicated with the exhaust tank module 2 via the second pump 41, and the second pump 41 pumps the electroplating liquid in the third receiving chamber 14 to the exhaust tank module 2. The clamping module 3 is disposed around the opening 131, and used to cover a product on the opening 131.

Specifically, the fin 15 is in transmission connection with a motor 16, and the fin 15 swings under an action of the motor 16.

Specifically, the first box 11 has a first sensor 111 therein, and the first sensor 111 is used to sense a level of electroplating liquid in the first receiving chamber 12.

Specifically, the top of the second receiving chamber 13 has a second sensor 112, and the second sensor 112 is used to sense a level of electroplating liquid in the second receiving chamber 13.

Specifically, the third receiving chamber 14 has a third sensor 113 therein, and the third sensor 113 is used to sense a level of electroplating liquid in the third receiving chamber 14.

Specifically, the exhaust tank module 2 includes a second box 20, the second box 20 has a fourth receiving chamber 21, a bottom of the second box 20 has a fifth baffle 22, one side of the fifth baffle 22 has a second baffle 23, and the second baffle 23 is set on a top of the second box 20.

Specifically, a side of the clamping module 3 attached to the opening 131 has a sealing ring 31 thereon.

Specifically, a pipeline communicated with the third receiving chamber 14 and the external circulation tank 5 has a return air-operated valve (not shown in drawings) thereon; the first receiving chamber 12 and the fourth receiving chamber 21 further has a return air-operated valve (not shown in drawings) therebetween.

Figure 10:
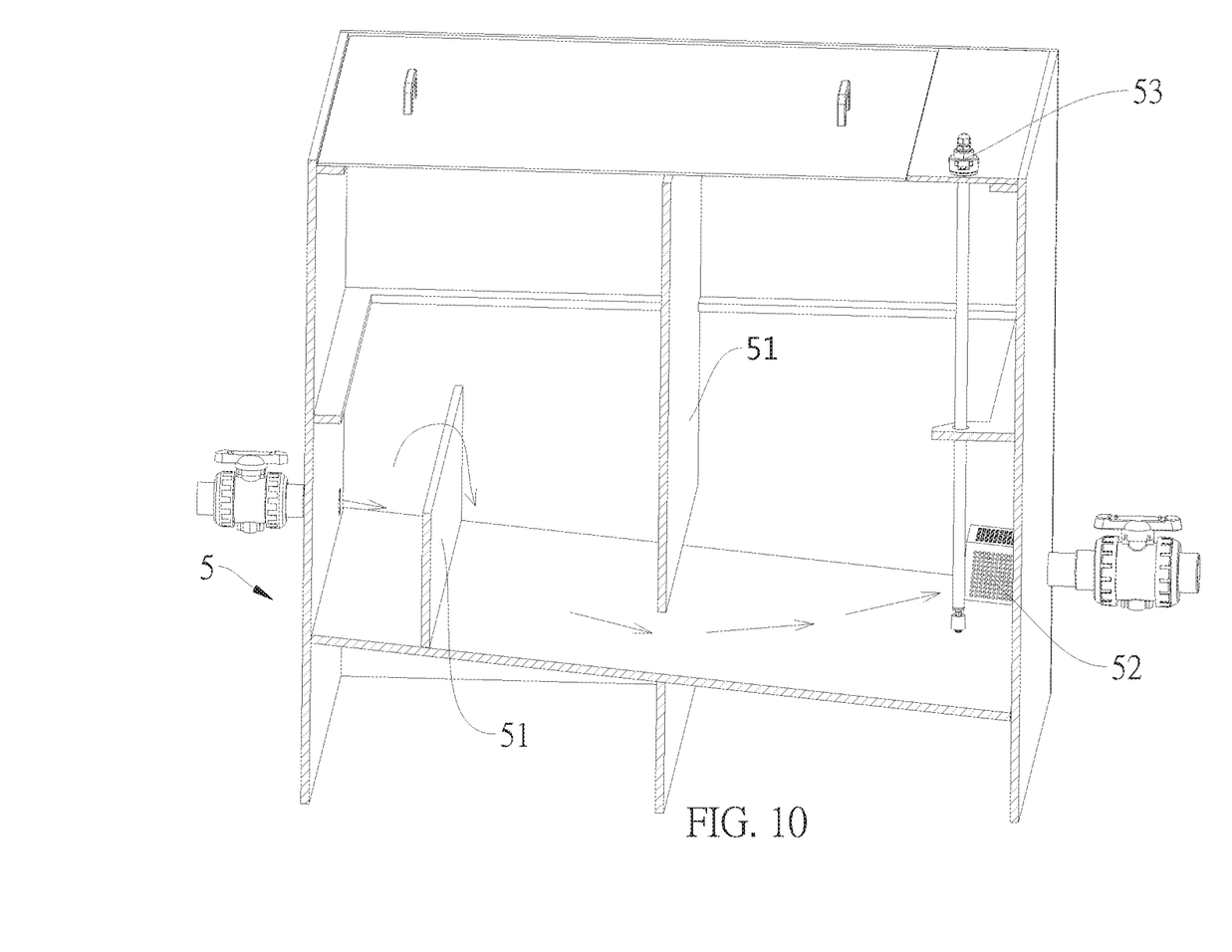
FIG. 10 is a schematic diagram showing interior of an external circulation tank according to an embodiment of the present disclosure.

Refer to FIG. 10, and FIG. 10 is a schematic diagram showing interior of an external circulation tank according to an embodiment of the present disclosure. Specifically, the vertical electroplating module for the fan-out panel level chip 100 further comprises an external circulation tank 5, the external circulation tank 5 is connected to the second pump 41, the second pump 41 pumps the electroplating liquid in the third receiving chamber 14 to the external circulation tank 5, and the external circulation tank 5 is communicated with the fourth receiving chamber 21 via the third pump 42. The external circulation tank 5 has a third baffle 51 therein. The third baffle 51 is disposed on a bottom of the external circulation tank 5. The electroplating liquid entering the external circulation tank 5 firstly enters one side of the third baffle 51, and then enters other one side of the third baffle 51 from a top of the third baffle 51. Then, via the suction inlet 52 of the second pump 41, the chemical medicine in the external circulation tank 5 is pumped to the exhaust tank module 2. The external circulation tank 5 further comprises a fifth sensor 53, and the fifth sensor 53 is used to sense a level of the chemical medicine in the external circulation tank 5, so as to prevent the damage caused by the empty suction of the third pump 42.

Figure 9:
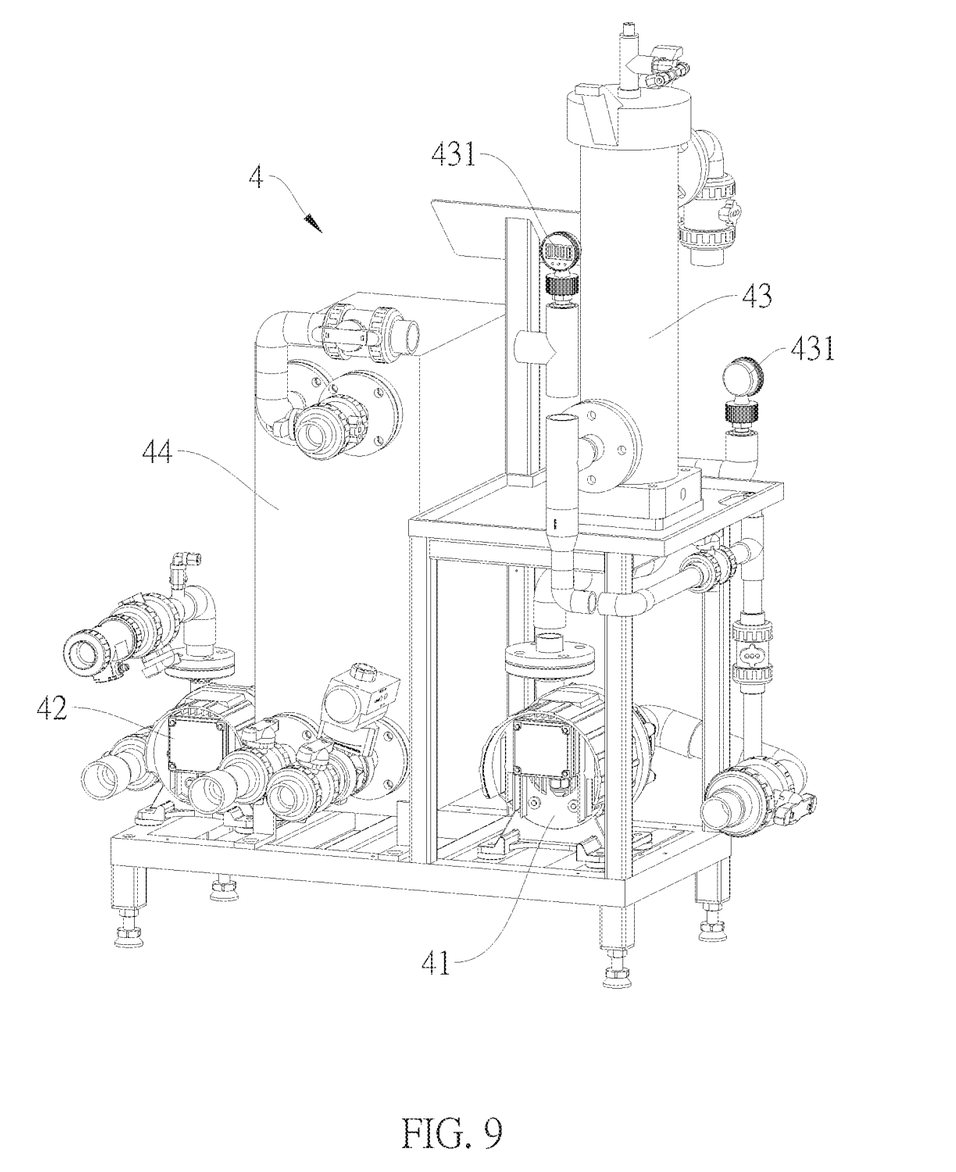
FIG. 9 is a schematic diagram showing interior of a filter module according to an embodiment of the present disclosure.

Refer to FIG. 9, and FIG. 9 is a schematic diagram showing interior of a filter module according to an embodiment of the present disclosure. The second pump 41 and the third pump 42 are disposed in a filter module 4. The filter module 4 further comprises a filter tank 43 and plate heat exchanger 44 disposed therein. The third pump 42 sucks the chemical medicine from the external circulation tank 5. Via the filter tank 43 and the plate heat exchanger 44, the chemical medicine is spit out to the first receiving chamber 12, and the suction inlet 52 of the second pump 41 pumps the chemical medicine of the exhaust tank module 2 to the external circulation tank 5. In addition to the chemical medicine used in production, which enters and exits the plate heat exchanger 44, ice water to further enters the plate heat exchanger 44 to control the temperature of the chemical medicine during production, and there is a pneumatic valve at the entrance of the ice water (not shown in drawings). During production, if the monitored temperature is high, it will automatically open the pneumatic valve and pass the ice water to cool the chemical medicine. When the temperature of the medicine is stable, the pneumatic valve will automatically close to stop the ice water cooling. A pressure gauge 431 is installed in front and back ends of the filter tank 43 to detect the pressure difference of the front and back ends of the filter tank 43. If the pressure difference is large, the filter element of the filter tank 43 is clogged, and the personnel are reminded to clean and replace the filter element immediately. There is an exhaust port on the top of the filter tank 43. When the personnel replace the filter element, there will be gas in the filter tank 43. Opening the exhaust port can effectively remove the air bubbles in the pipeline and filter tank 43 to control the stability of production.

Figure 1:
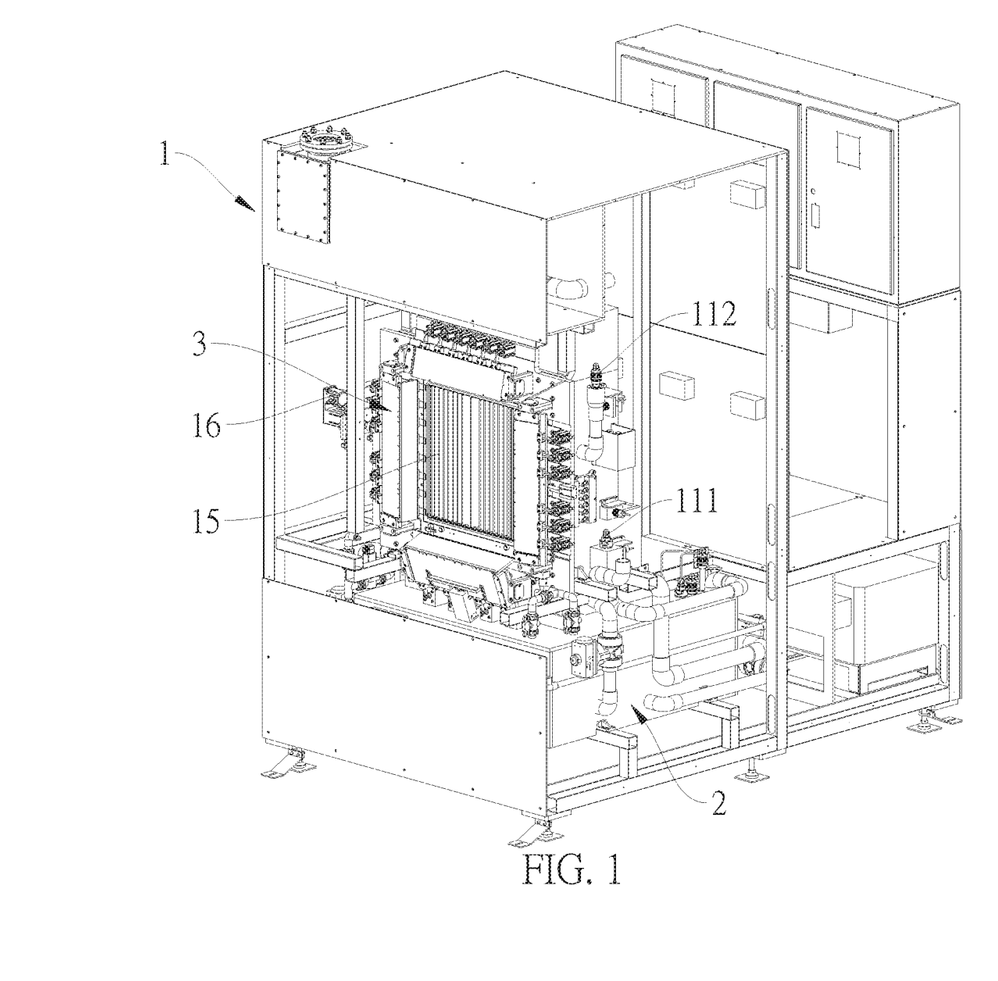
FIG. 1 is a schematic diagram showing a structure of a vertical electroplating module for a fan-out panel level chip according to an embodiment of the present disclosure.

In this embodiment, please refer to FIG. 1. The vertical electroplating module for a fan-out panel level chip 100 of the present disclosure includes a rectangular support frame, the bottom of the support frame is provided with an exhaust tank module 2, and the electroplating tank module 1 is disposed on the top of the exhaust tank module 2. The clamping module 3 is disposed on the left side of the electroplating tank module 1.

Specifically, refer to FIG. 2A, FIG. 2B, and FIG. 3 through FIG. 5, and in the embodiment, a first receiving chamber 12 is disposed on a left side of the bottom of the electroplating tank module 1. The first receiving chamber 12 is connected with the bottom of the first pump 17. The first receiving chamber 12 is provided with a first sensor 111 inside. The top of the first receiving chamber 12 is provided with a second receiving chamber 13, and the top of the second receiving chamber 13 is provided with a second sensor 112. The right side of the first receiving chamber 12 and the second receiving chamber 13 is provided with a third receiving chamber 14, the third receiving chamber 14 is communicated with the top of the second receiving chamber 13, the third receiving chamber 14 is provided with a third sensor 113 inside, and the bottom of the third receiving chamber 14 is communicated with the second pump 41.

Figure 3:
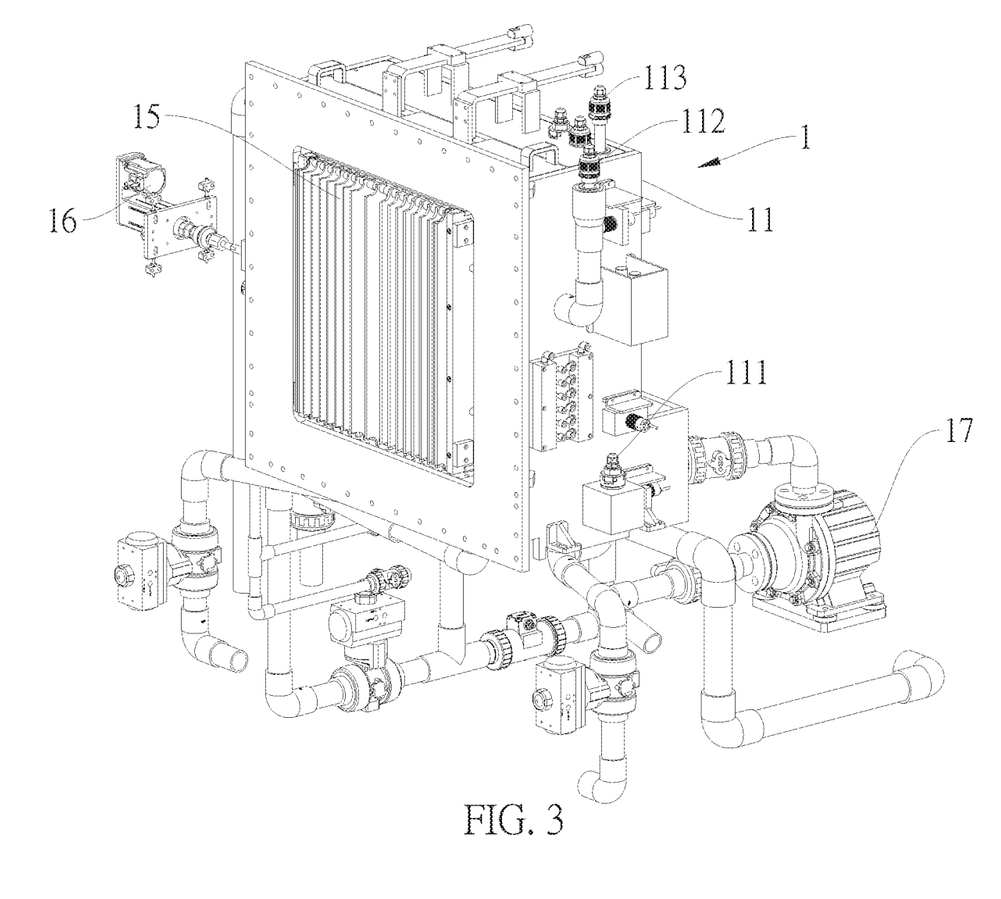
FIG. 3 is a schematic diagram showing a structure of an electroplating tank module according to an embodiment of the present disclosure.
Figure 4:
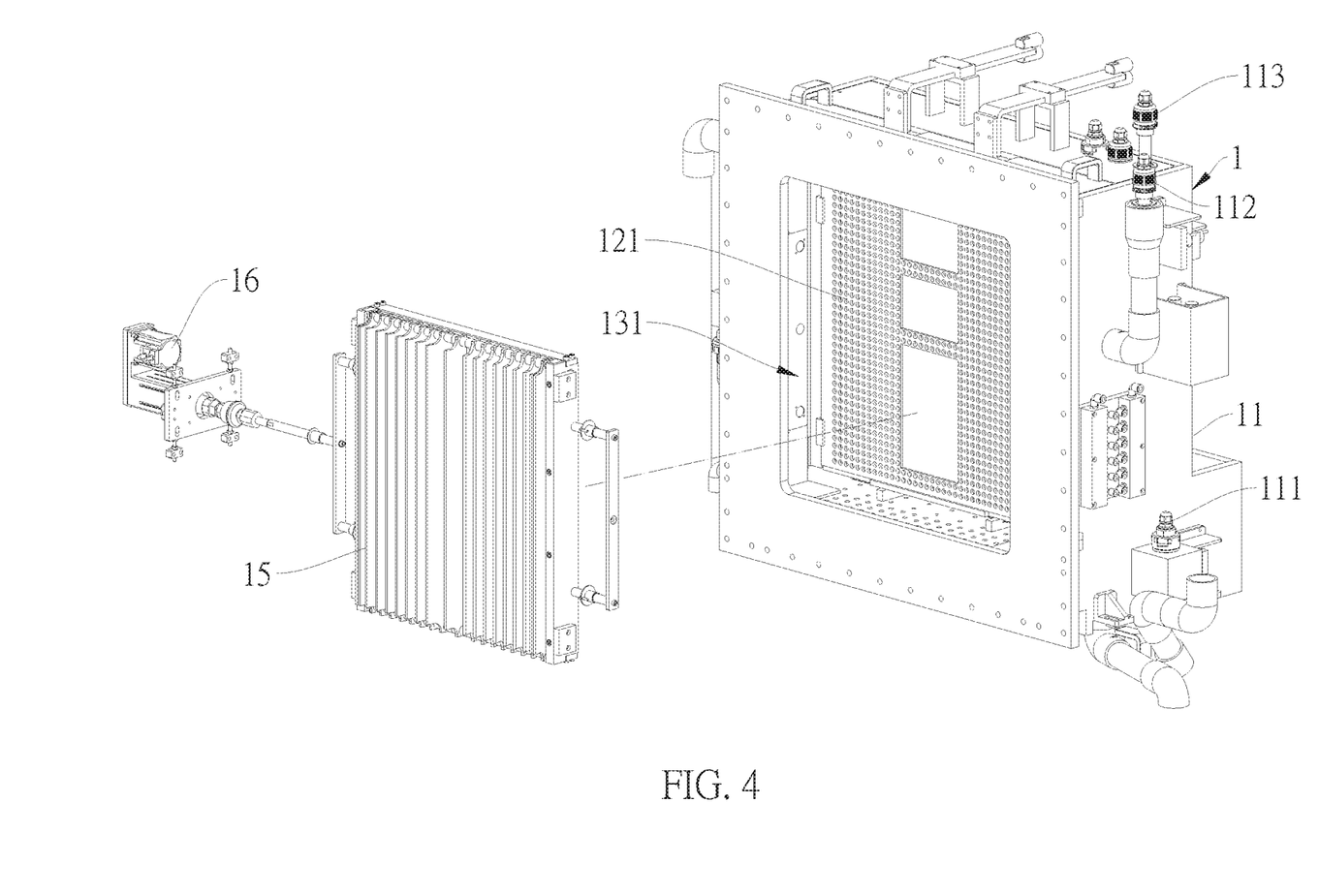
FIG. 4 is an explosive diagram showing a structure of an electroplating tank module according to an embodiment of the present disclosure.
Figure 5:
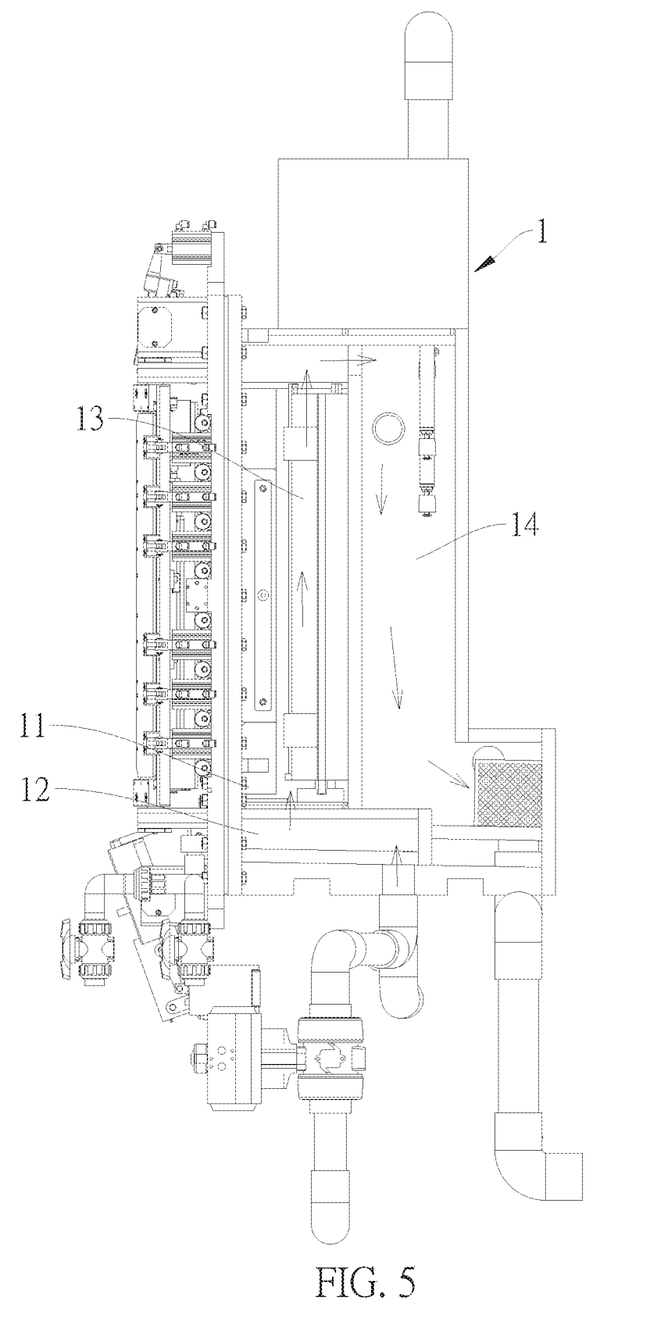
FIG. 5 is a schematic diagram showing interior of a vertical electroplating module for a fan-out panel level chip according to an embodiment of the present disclosure.

Specifically, refer to FIG. 4, and there is a rectangular opening 131 on the left side of the second receiving chamber 13. Refer to FIG. 3, the opening 131 has fins 15, and the fin 15 is in transmission connection with a motor 16.

Specifically, refer to FIG. 2A, FIG. 2B, FIG. 3 and FIG. 4, and the opening 131 is surrounded by a clamping module 3. There is a sealing ring on the surface where the clamping module 3 and the opening 131 are attached. When the clamping module 3 fixes the product on the outside of the fin 15, the product and the clamping element can tightly close the opening 131 to form a sealed state to prevent the electroplating liquid from being exposed.

Figure 6:
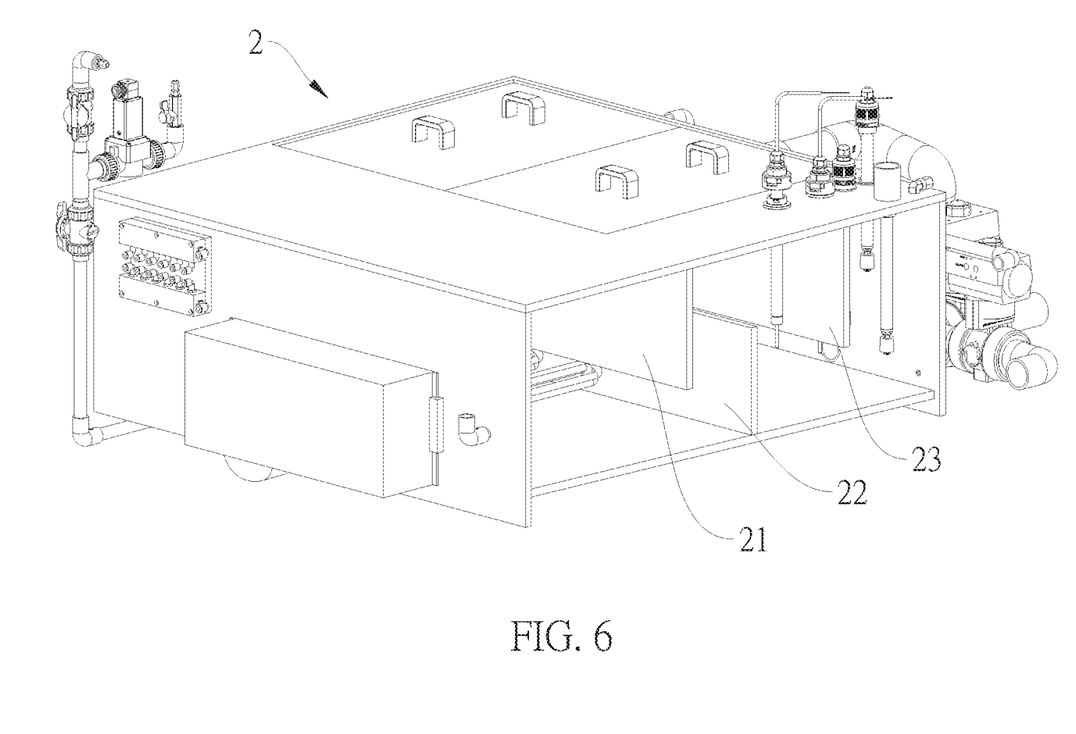
FIG. 6 is a schematic diagram showing interior of an exhaust tank module according to an embodiment of the present disclosure.

Specifically, refer to FIG. 6, and the bottom of the electroplating tank module 1 has the exhaust tank module 2. The second box 20 of the exhaust tank module 2 is provided with a fourth receiving chamber 21 inside, the middle of the bottom of the fourth receiving chamber 21 is vertically provided with a fifth baffle 22, and the upper wall on the right side of the fifth baffle 22 is provided with a second baffle 23. The left side of the fifth baffle 22 is communicated with the first receiving chamber 12 via the first pump 17, and the right side of the second baffle 23 is communicated with the third receiving chamber 14 via the second pump 41. There is also a third pump 42 disposed in the fourth receiving chamber 21. The third pump 42 is used to transfer the electroplating liquid from the right side of the fifth baffle 22 to the left side of the fifth baffle 22.

Specifically, the first sensor 111, the second sensor 112, and the third sensor 113 are used to sense the liquid levels in the corresponding receiving chambers.

Figure 2A:
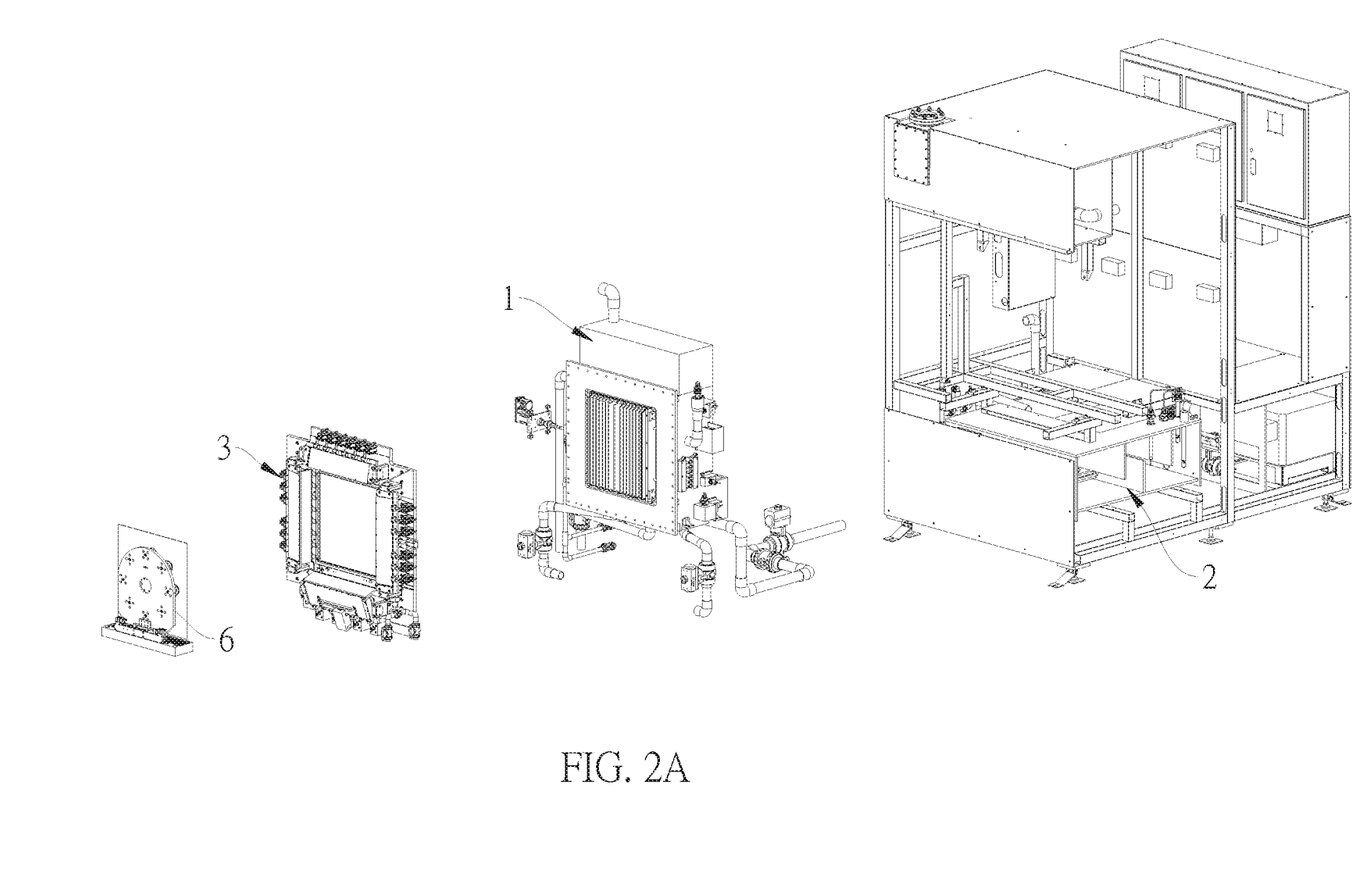
FIG. 2A is an explosive diagram showing a vertical electroplating module for a fan-out panel level chip according to an embodiment of the present disclosure.
Figure 2B:
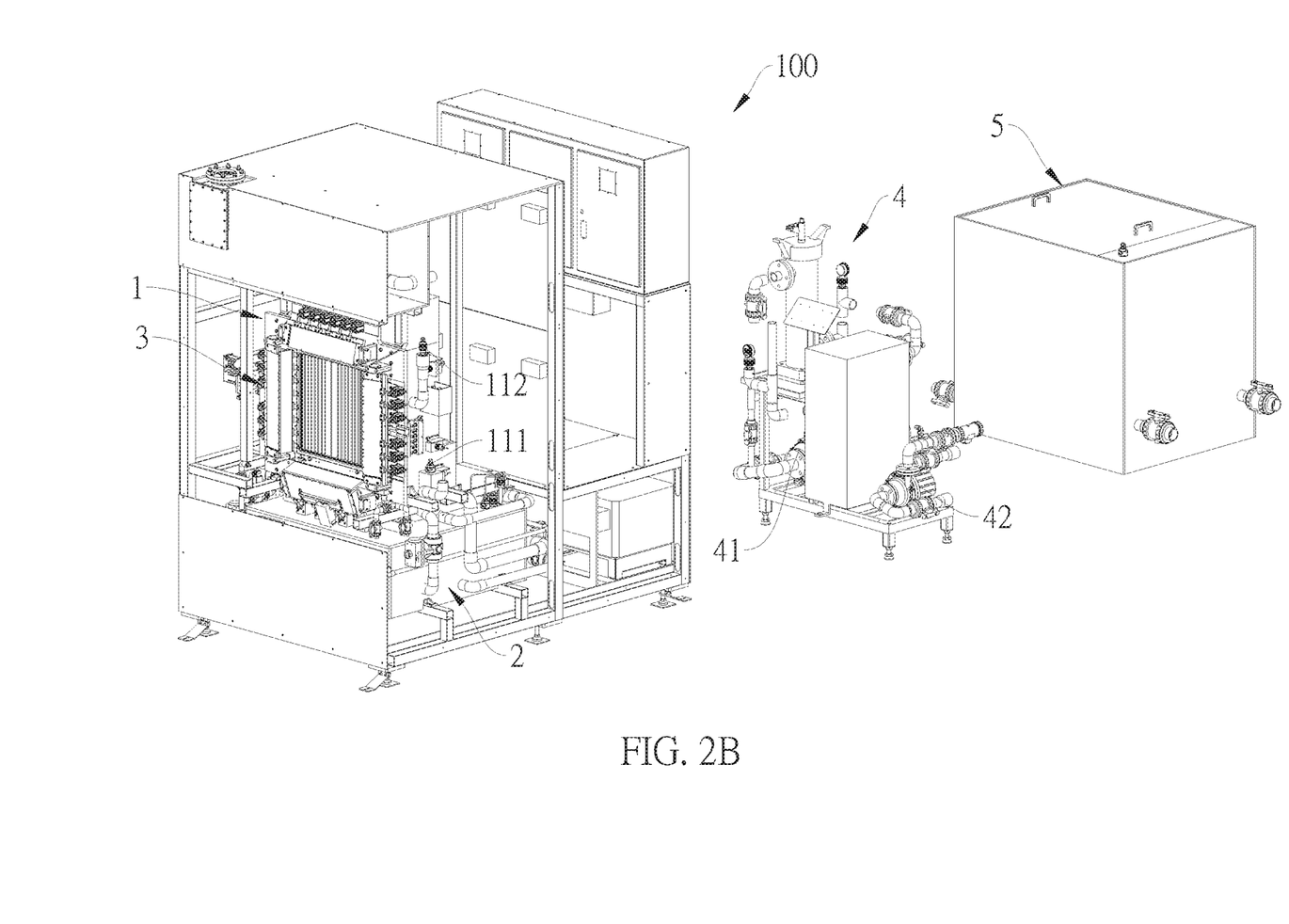
FIG. 2B is a schematic diagram showing a whole structure of a vertical electroplating module for a fan-out panel level chip according to an embodiment of the present disclosure.

Specifically, in the embodiment, refer to FIG. 1 and FIG. 2A, and the vertical electroplating module for a fan-out panel level chip 100 also includes a vacuum adsorption robotic arm 6, which is used to transport the product to be electroplated to the clamping module 3.

Figure 7:
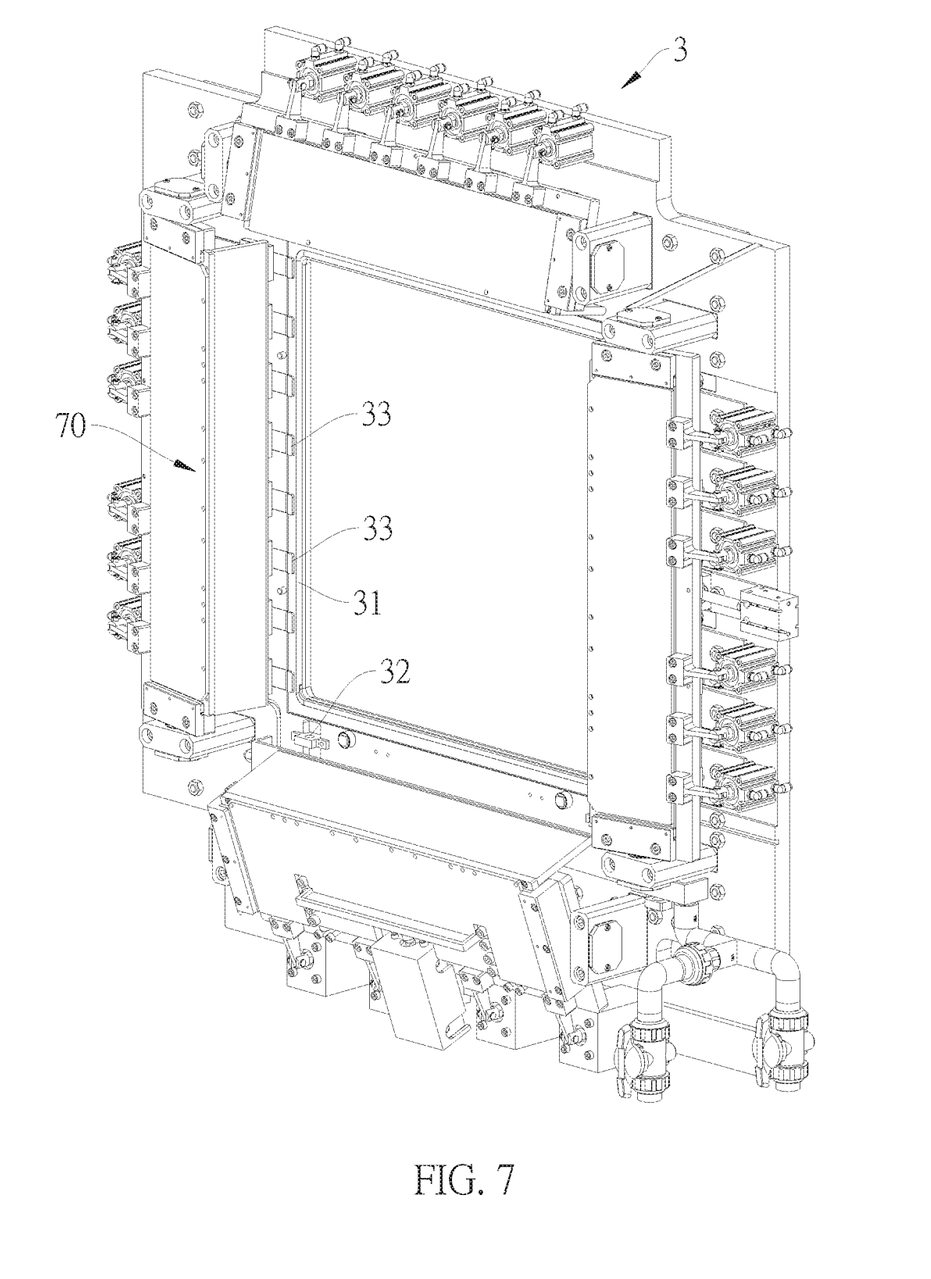
FIG. 7 is a schematic diagram showing a structure of a clamping module according to an embodiment of the present disclosure.
Figure 8A:
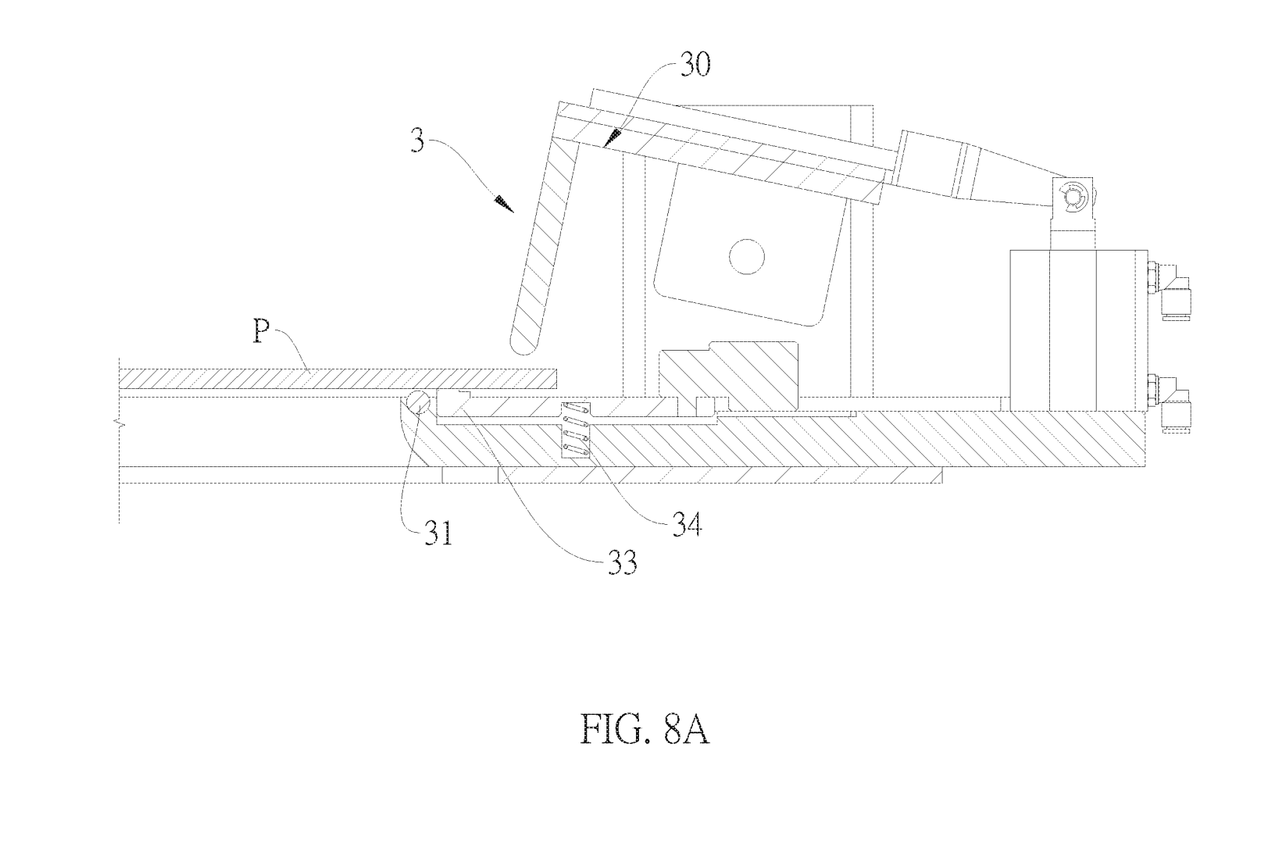
FIG. 8A is a schematic diagram showing an operation of clamping and loading a product by a clamping module according to an embodiment of the present disclosure.
Figure 8B:
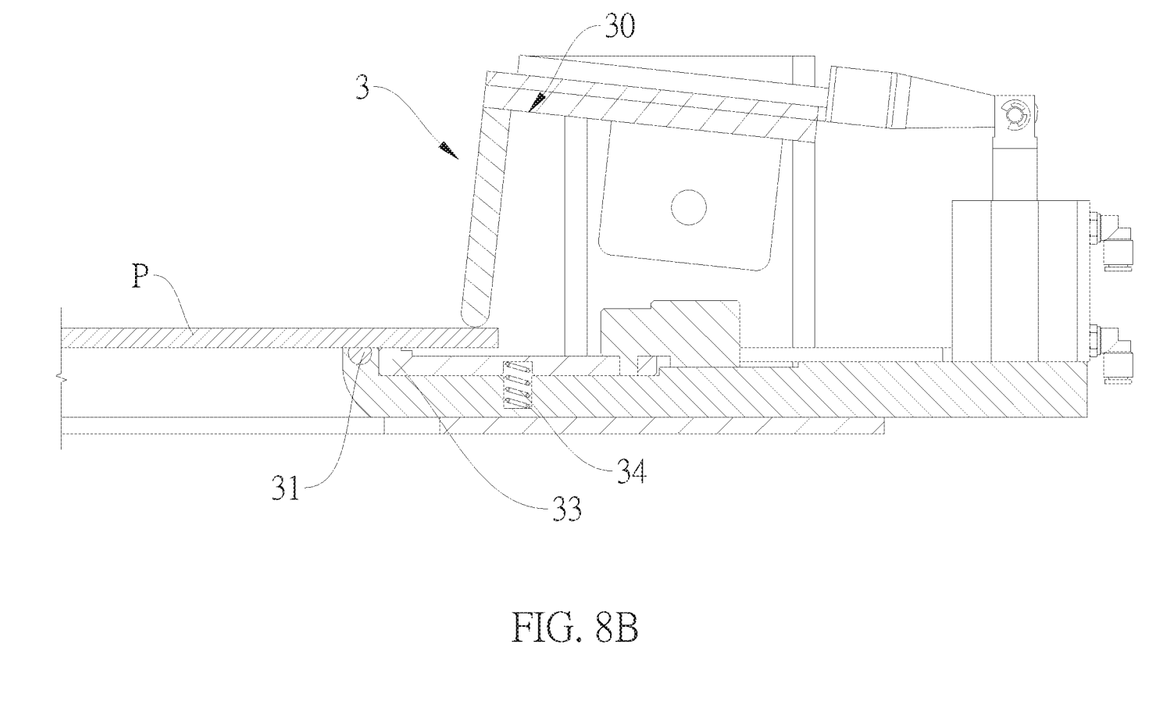
FIG. 8B is a schematic diagram showing an operation of clamping and pushing down a product by a clamping module according to an embodiment of the present disclosure.

Specifically, in the embodiment, refer to FIG. 7, FIG. 8A and FIG. 8B, and the clamping module 3 comprise four jaws 30. The four jaws 30 are respectively arranged on the four edges of the opening 131, so that there is an electroplating area in the middle, and there is at least one fourth sensor 32 on the clamping module 3, and the fourth sensor 32 is used to sense whether the product P to be electroplated is placed on the opening 131. Specifically, The side which the clamping module 3 is attached to the opening 131 is provided with a sealing ring 31, a plurality of electroplating copper blocks 33 are provided on two opposite sides of the sealing ring 31, and the opposite parallel ends of the electroplating copper block 33 and the sealing ring 31 are further provided with a plurality of telescopic springs 34. When the product is pressed on the sealing ring 31, the jaw 30 presses down. At this time, the pressure point of the jaw 30 is the same as the sealing ring 31. The sealing ring 31 compresses and touches the electroplating copper block 33 on the telescopic spring 34, so that the product P and the sealing ring 31 are completely sealed. At this time, the right side of product P is in full contact with the electroplating copper block 33, which can prevent the chemical medicine on the electroplating area on the left of product P from seeping out during production, and can effectively avoid abnormal liquid leakage. Accordingly, the clamping module can be used to clamp and conduct the product, and the problem of immersing the conventional fixture in the portion tank is eliminated. The edge of the product is directly attached to the conductive copper block, and there is a sealing ring to isolate the chemical medicine and the conductive copper block. When the rectifier is turned on, the surface of the product can be communicated with the electroplating liquid, and the copper ions in the chemical medicine are plated on the product.

By using the above structure, to achieve the above objective, refer to FIG. 1, FIG. 2A, FIG. 2B and FIG. 11, the present disclosure provides an electroplating method using the vertical electroplating module for the fan-out panel level chip, and the steps of the electroplating method are illustrated as follows.

As shown in FIG. 1 and FIG. 2A, the product to be electroplated is sent to the left side of the opening 131 by using the robotic arm 6. After the fourth sensor 32 senses that the product is in place, the clamping module 3 clamps the product on the opening 131.

Further, refer to FIG. 7, FIG. 8A and FIG. 8B, and the clapper cylinder (not shown in drawings) of the clamping module 3 can clap the product P, so that the right side of the product P is positioned to the left to ensure the positioning of the product P. After confirming that the product P is in place, the jaws 30 on the left and right sides will first extend and press down to fix the product, and then the upper and lower jaws 30 extend and press down to fix the product P, so that the product P can be firmly clamped for subsequent electroplating.

The clamping module 3 clamps the product on the left side of the fin 15 to ensure that the product and clamping module 3 can seal the opening 131.

Specifically, the product is disposed on the clamping module 3, and the side that needs electroplating is in contact with the chemical medicine in the electroplating tank module 1. The surrounding sealing ring 31 and the clamping module 3 on the other side are used to prevent the chemical medicine from seeping out in the second receiving chamber 13, and the other side which the clamping module 3 is opposite to the electroplating tank module 1 does not need to contact the chemical medicine, which makes it directly contact with air. Therefore, when the side that is in contact with the chemical medicine is energized, there will be copper deposited on the surface, while the other side that is not in contact with the chemical medicine will not be plated with copper, nor will it be attacked by the corrosion of the chemical medicine. The production made by the vertical electroplating module can meet a single-side production, without immersing the entire product in the chemical medicine.

Specifically, the first pump 17 is activated, and the first pump 17 pumps the electroplating liquid in the left side of the fifth baffle 22 on the fourth receiving chamber 21 in the exhaust tank module 2 into the first receiving chamber 12, and the electroplating liquid in the first receiving chamber 12 flows to the second receiving chamber 13 via the hole of the top of the first receiving chamber 12. When the electroplating liquid in the second receiving chamber 13 has not passed the upper end of the product, and the second sensor 112 senses that the electroplating liquid in the second receiving chamber 13 has reached the level for electroplating, the electroplating tank module 1 starts electroplating the product, and the motor 16 drives the fin 15 to swing. The fin 15 uses the principle of fluid mechanics to realize the function of eliminating bubbles and filling holes in the electroplating tank, and fully stir the chemical medicine in the electroplating tank to improve the uniformity of product electroplating.

Figure 11:
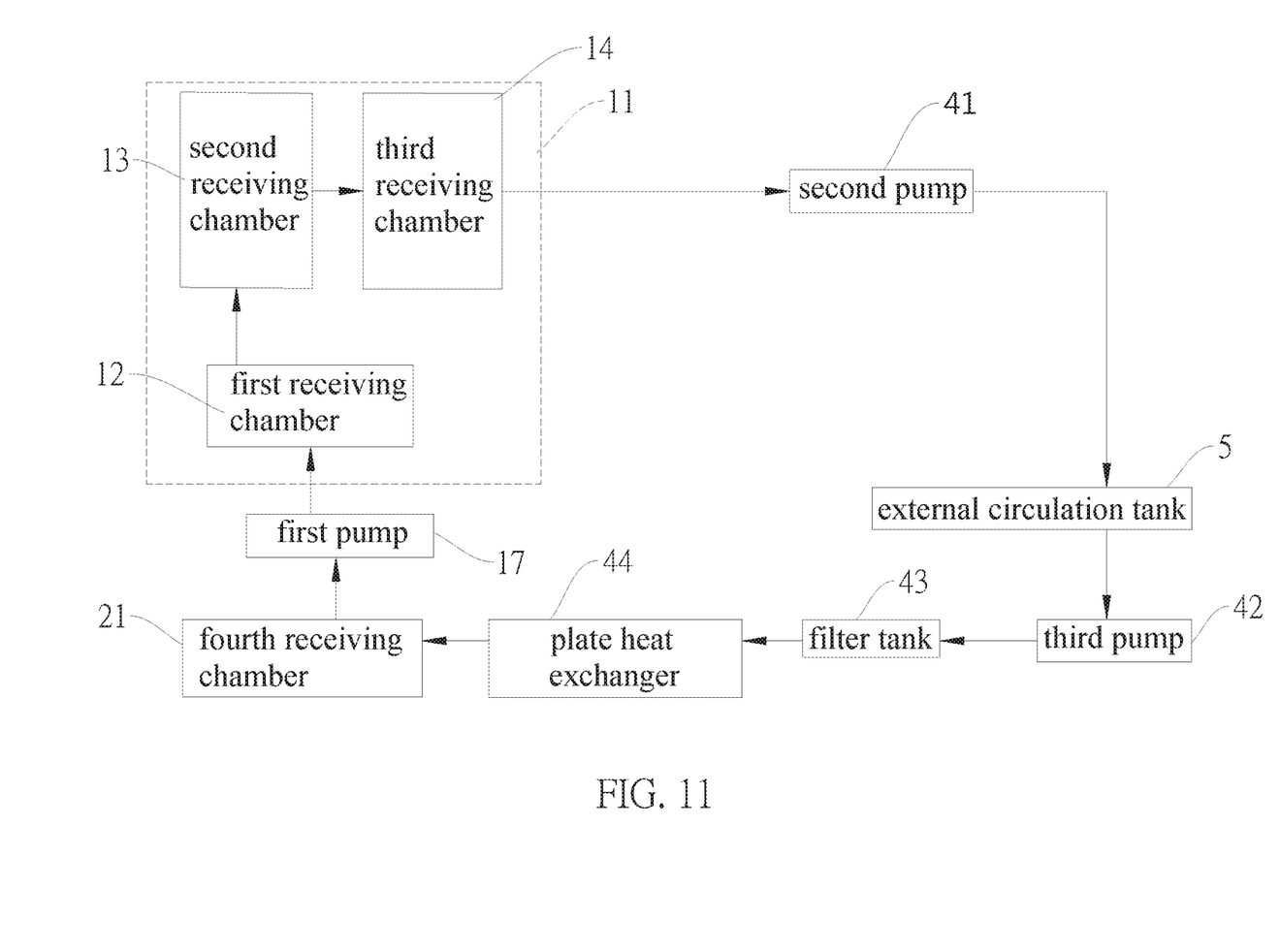
FIG. 11 is a block diagram showing an electroplating process according to an embodiment of the present disclosure.

Refer to FIG. 11, specifically, When the liquid level in the second receiving chamber 13 reaches a certain level and the electroplating liquid in the second receiving chamber 13 starts to enter the third receiving chamber 14, and the third sensor 113 senses that the electroplating liquid enters the third receiving chamber 14, the second pump 41 is activated to pump the electroplating liquid into the right side of fifth baffle 22 of the fourth receiving chamber 21. When the liquid level of the electroplating liquid on the right side of fifth baffle 22 reaches the height of fifth baffle 22, the electroplating liquid starts to enter the left side of fifth baffle 22 from the top of fifth baffle 22. The fifth baffle 22 is used for diversion, so that the chemical medicine injected from second pump 41 is fully exhausted in exhaust tank module 2, and the bubble problem in second receiving chamber 13 (i.e. electroplating tank) is reduced.

Specifically, when the electroplating time elapses, the electroplating and the swing of fin 15 are stopped, the first pump 17 and the third pump 42 are turned off, the second pump 41 continues to pump the electroplating liquid in the electroplating tank module 1 into the right side of the fifth baffle 22 in the fourth receiving chamber 21, and at the same time, the air-operated valve is turned on to return the electroplating liquid in the first receiving chamber 12 to the fourth receiving chamber 21. When the first sensor 111 and the second sensor 112 sense that the electroplating liquid in the first receiving chamber 12 and the third receiving chamber 14 are exhausted, the clamping module 3 is activated to take out the electroplated product.

It can be known that, the vertical electroplating module provided by the present disclosure is composed of an electroplating tank module 1, an exhaust tank module 2, a clamping module 3 and other modules, which can be produced in a modular fashion, and can be adjusted according to product changes and capacity requirements, and can effectively solve the problem of the existing vertical electroplating module that the entire production line must be repurchased when the capacity demand increases, and at the same time can solve the problem of the site caused by the excessively large equipment area; and moreover, the modular combination method will not stop the whole line when one vertical electroplating module fails, and other vertical electroplating modules can still produce products normally to avoid the whole line stagnation caused by abnormalities.

Although particular embodiments of the present disclosure have been described in detail for purposes of illustration, various modifications and enhancements may be made without departing from the spirit and scope of the present disclosure. Accordingly, the present disclosure is not to be limited except as by the appended claims.

The invention claimed is:

1. A vertical electroplating module for a fan-out panel level chip, at least comprising:
    an electroplating tank module comprising a first box, wherein the first box has a first receiving chamber, a second receiving chamber and a third receiving chamber therein, the first receiving chamber has an electroplating anode mesh therein, the first receiving chamber and the second receiving chamber communicate with each other, the second receiving chamber and the third receiving chamber communicate with each other, a wall of the second receiving chamber has an opening thereon, the opening has fins thereon, the first receiving chamber communicates with a bottom of the second receiving chamber, and a top of the second receiving chamber communicates with the third receiving chamber;
    an exhaust tank module communicates with the first receiving chamber and the third receiving chamber via a first pump and a second pump respectively; and
    a clamping module surrounds the opening.

2. The vertical electroplating module for the fan-out panel level chip according to claim 1, wherein the fins are in transmission connection with a motor, and the fins swing under an action of the motor.

3. The vertical electroplating module for the fan-out panel level chip according to claim 1, wherein the first box has a first sensor therein, and the first sensor senses a level of electroplating liquid in the first receiving chamber and the third receiving chamber.

4. The vertical electroplating module for the fan-out panel level chip according to claim 1, wherein the top of the second receiving chamber has a second sensor, and the second sensor senses a level of electroplating liquid in the second receiving chamber.

5. The vertical electroplating module for the fan-out panel level chip according to claim 1, wherein the third receiving chamber has a third sensor therein, and the third sensor senses a level of electroplating liquid in the third receiving chamber.

6. The vertical electroplating module for the fan-out panel level chip according to claim 1, wherein the exhaust tank module includes a second box, the second box has a fourth receiving chamber, a bottom of the second box has a fifth baffle, one side of the fifth baffle has a second baffle, and the second baffle is set on a top of the second box.

7. The vertical electroplating module for the fan-out panel level chip according to claim 6, wherein the vertical electroplating module for the fan-out panel level chip further comprises an external circulation tank, the external circulation tank connects to the second pump, the second pump pumps electroplating liquid in the third receiving chamber to the external circulation tank, and the external circulation tank communicates with the fourth receiving chamber via a third pump; the external circulation tank has a third baffle therein, the third baffle is set at a bottom of the external circulation tank, and the electroplating liquid entering the external circulation tank firstly enters one side of the third baffle, and then enters other one side of the third baffle from a top of the third baffle.

8. The vertical electroplating module for the fan-out panel level chip according to claim 7, wherein a pipeline communicates with the third receiving chamber and the external circulation tank has a return air-operated valve thereon.

9. The vertical electroplating module for the fan-out panel level chip according to claim 1, wherein a side of the clamping module which attaches to the opening has a sealing ring thereon.

10. The vertical electroplating module for the fan-out panel level chip according to claim 9, wherein the clamping module includes four jaws, the four jaws are respectively arranged around the opening, and two opposite sides of the sealing ring have electroplating copper blocks thereon, opposite parallel ends of each electroplating copper block and the sealing ring further have telescopic springs.

11. A vertical electroplating module for a fan-out panel level chip, at least comprising:
an electroplating tank module comprising a first box, wherein the first box has a first receiving chamber, a second receiving chamber and a third receiving chamber therein, the first receiving chamber has an electroplating anode mesh therein, the first receiving chamber and the second receiving chamber communicate with each other, the second receiving chamber and the third receiving chamber communicate with each other, a wall of the second receiving chamber has an opening thereon, the opening has fins thereon, electroplating liquid in the first receiving chamber flows to a bottom of the second receiving chamber, and the electroplating liquid flows to the third receiving chamber from a top of the second receiving chamber;
an exhaust tank module communicate with the first receiving chamber and the third receiving chamber respectively via a first pump and a second pump, wherein the first pump pumps the electroplating liquid in the exhaust tank module to the first receiving chamber, the electroplating liquid flows to the third receiving chamber from a top of the second receiving chamber, and the second pump pumps the electroplating liquid in the third receiving chamber to the exhaust tank module; and
a clamping module surrounds the opening to cover a product on the opening.

* * * * *